US012747025B2

(12) United States Patent
Dos Santos et al.

(10) Patent No.: US 12,747,025 B2
(45) Date of Patent: Sep. 29, 2026

(54) PROVIDING ENERGY IN AN AIRCRAFT USING DROOP CONTROL

(71) Applicant: SAFRAN, Paris (FR)

(72) Inventors: Victor Dos Santos, Moissy-Cramayel (FR); Florent Rougier, Moissy-Cramayel (FR); Isabelle Florent, Moissy-Cramayel (FR)

(73) Assignee: SAFRAN, Paris (FR)

( * ) Notice: Subject to any disclaimer, the term of this patent is extended or adjusted under 35 U.S.C. 154(b) by 105 days.

(21) Appl. No.: 18/710,584

(22) PCT Filed: Nov. 18, 2022

(86) PCT No.: PCT/FR2022/052127
§ 371 (c)(1),
(2) Date: May 15, 2024

(87) PCT Pub. No.: WO2023/094751
PCT Pub. Date: Jun. 1, 2023

(65) Prior Publication Data

US 2025/0033784 A1 Jan. 30, 2025

(30) Foreign Application Priority Data

Nov. 25, 2021 (FR) ...................................... 2112556

(51) Int. Cl.
*B64D 31/00* (2024.01)
*F01D 21/00* (2006.01)

(52) U.S. Cl.
CPC ........... *B64D 31/00* (2013.01); *F01D 21/003* (2013.01); *B64D 2221/00* (2013.01)

(58) Field of Classification Search
CPC .... B64D 31/00; B64D 2221/00; B64D 41/00; F01D 21/003
See application file for complete search history.

(56) References Cited

U.S. PATENT DOCUMENTS 5,977,648 A * 11/1999 Seffernick ............ H02K 7/1823 290/46
9,969,341 B2 * 5/2018 Henrard ................. B64D 47/00
10,428,739 B2 * 10/2019 Haillot ....................... F02C 3/13
11,851,200 B2 * 12/2023 Jacon ........................ F02C 7/20
(Continued)

FOREIGN PATENT DOCUMENTS

GB 2510121 A 7/2014

OTHER PUBLICATIONS

International Search Report received for PCT Patent Application No. PCT/FR2022/052127, mailed on Jan. 30, 2023, 5 pages (2 pages of English Translation and 3 pages of Original Document).

*Primary Examiner* — Mussa A Shaawat
(74) *Attorney, Agent, or Firm* — WOMBLE BOND DICKINSON (US) LLP

(57) ABSTRACT

An apparatus for providing energy in an aircraft, including a DC bus; at least one low-pressure electrical source and at least one high-pressure electrical source. The apparatus further includes a system for calculating a droop gain for each electrical source, based on at least one operating characteristic of the turbine engine; and for each electrical source, a model for controlling the electrical source in question, which module is designed to implement a droop setting based on the droop gain calculated for the electrical source in question.

10 Claims, 15 Drawing Sheets

(56) References Cited

U.S. PATENT DOCUMENTS

| | | | | |
|---|---|---|---|---|
| 2009/0005886 | A1* | 1/2009 | Gao | G05B 13/02 700/29 |
| 2012/0173173 | A1* | 7/2012 | Spierling | F01D 15/10 702/58 |
| 2013/0008145 | A1* | 1/2013 | Sundstrom | F02K 1/72 60/226.2 |
| 2013/0094257 | A1* | 4/2013 | Warr | H02M 7/08 363/64 |
| 2014/0297155 | A1* | 10/2014 | Chen | F02C 7/042 701/100 |
| 2020/0083709 | A1* | 3/2020 | Umezu | H02P 9/00 |
| 2021/0207543 | A1* | 7/2021 | Rougier | F01D 15/10 |

* cited by examiner

[Fig. 1]
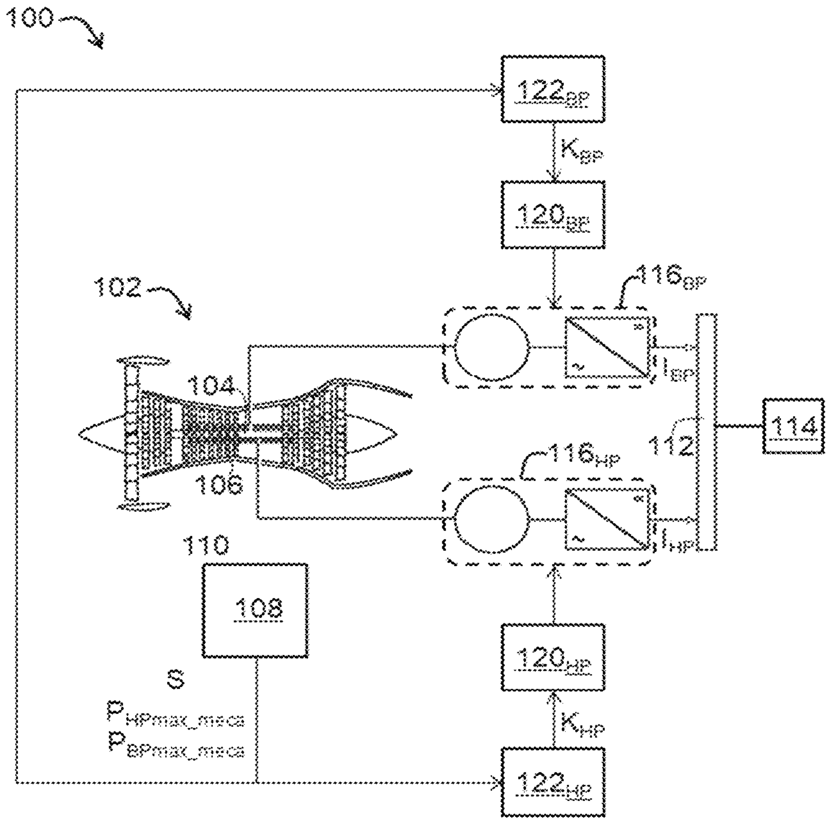

[Fig. 2]
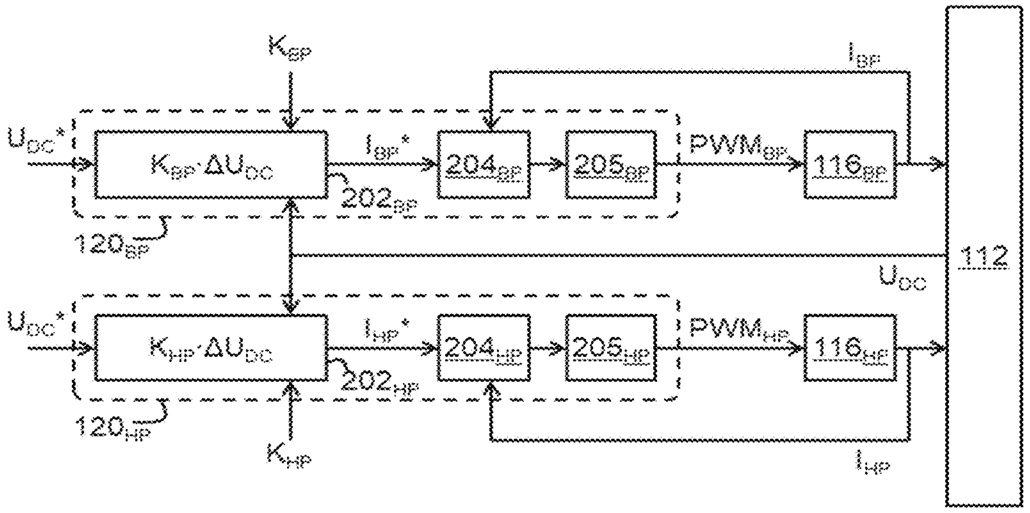

[Fig. 3]
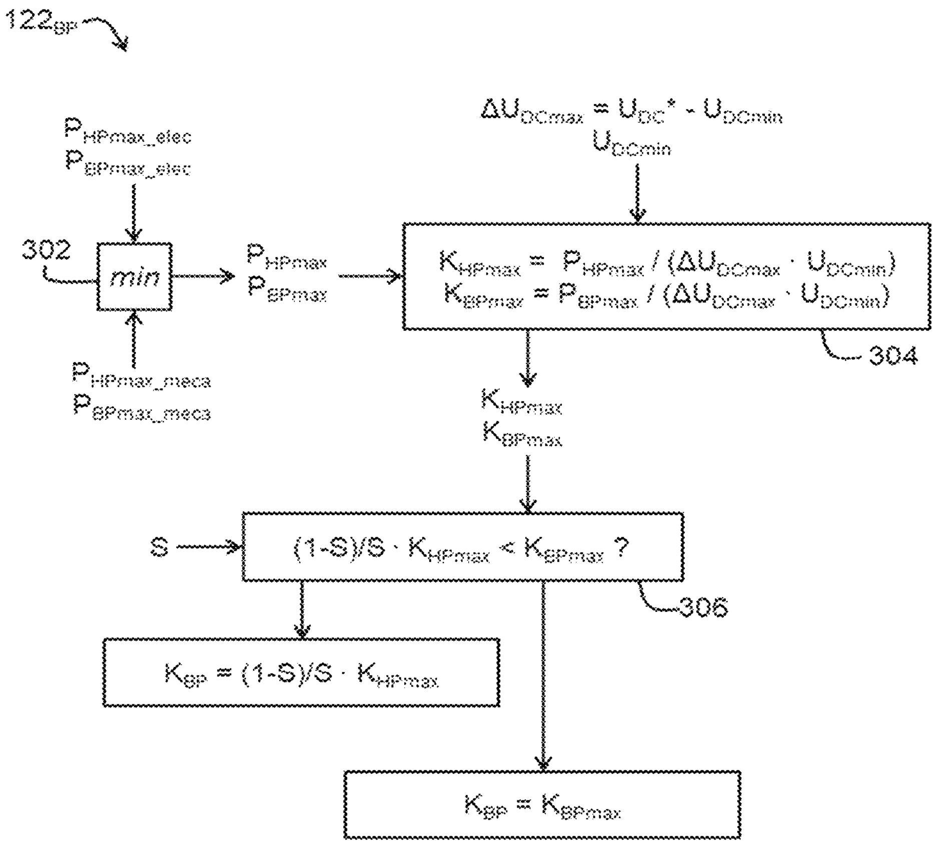

[Fig. 4]
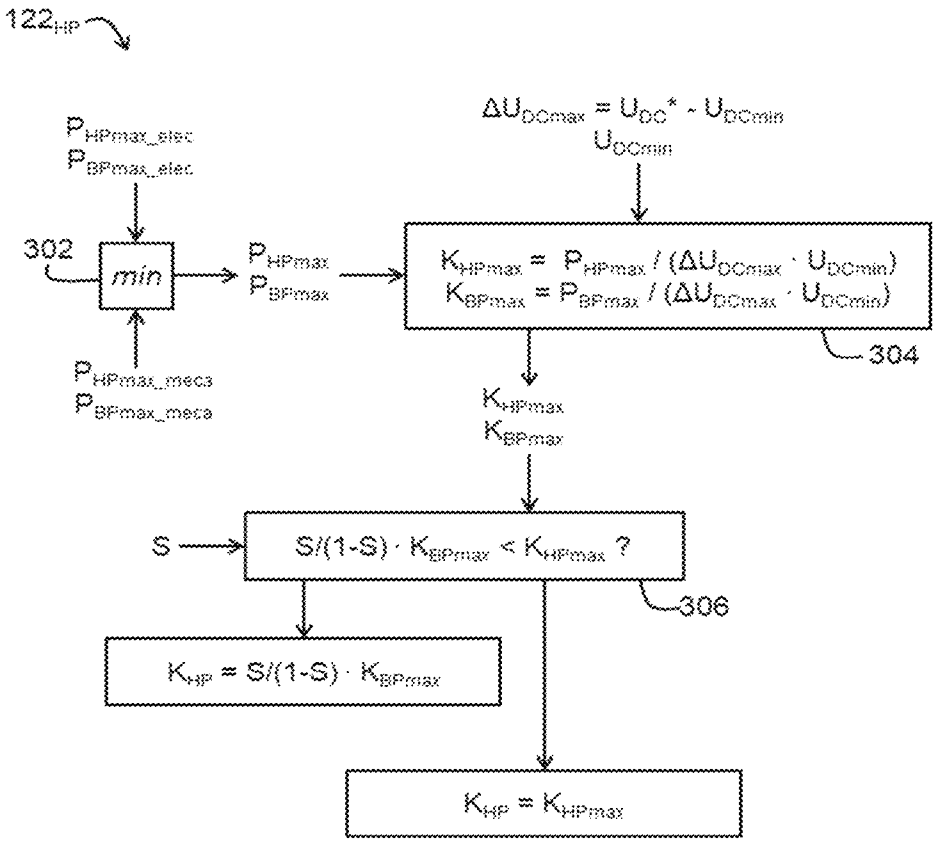

[Fig. 5]
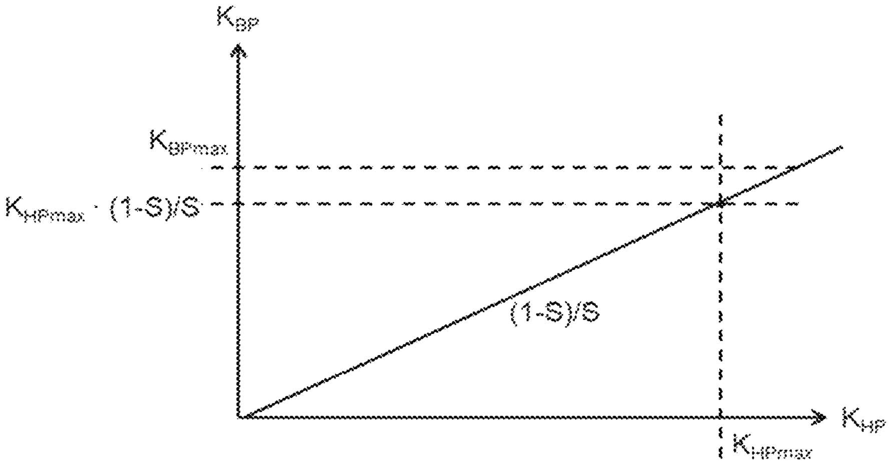

[Fig. 6]
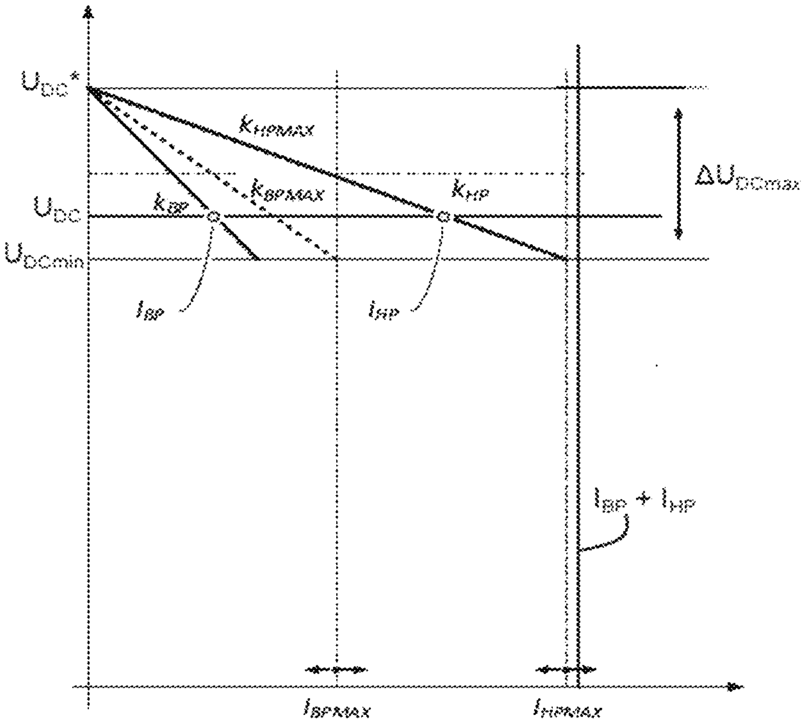

[Fig. 7]
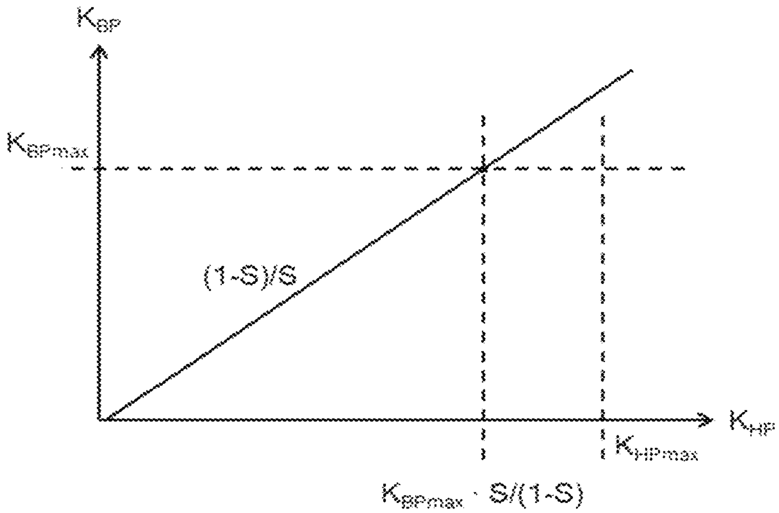

[Fig. 8]
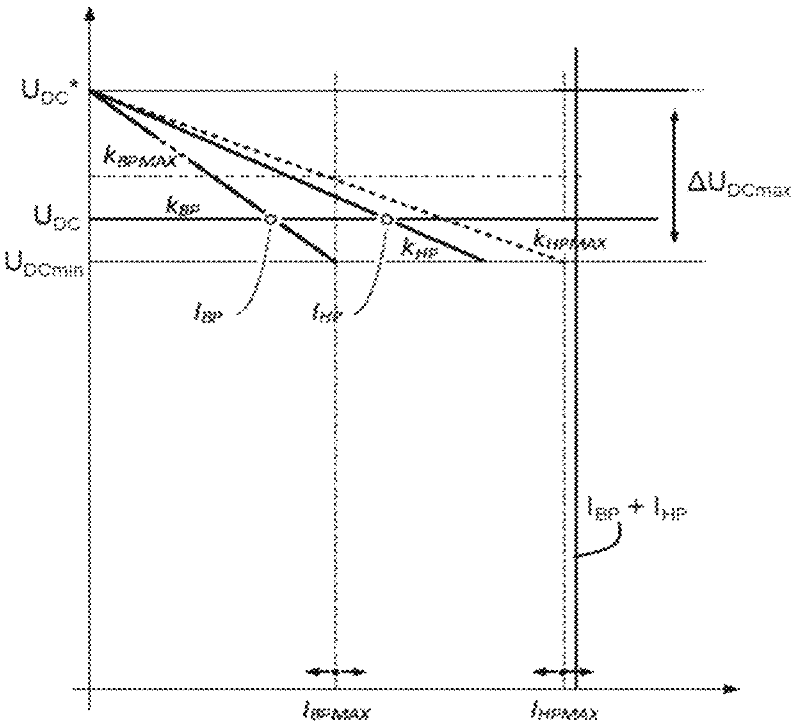

[Fig. 9]
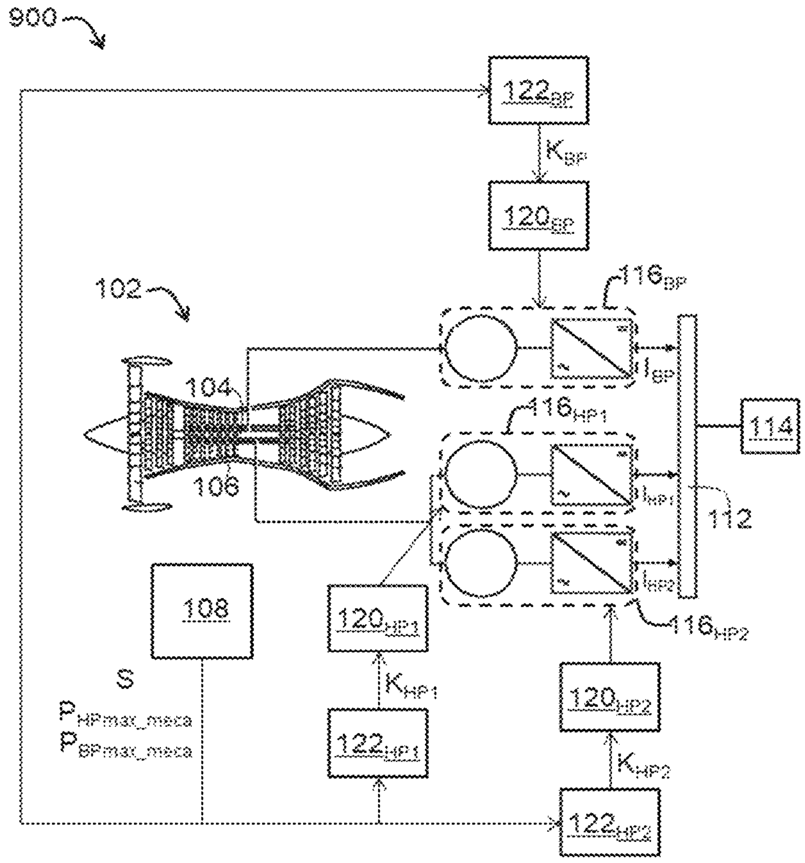

[Fig. 10]
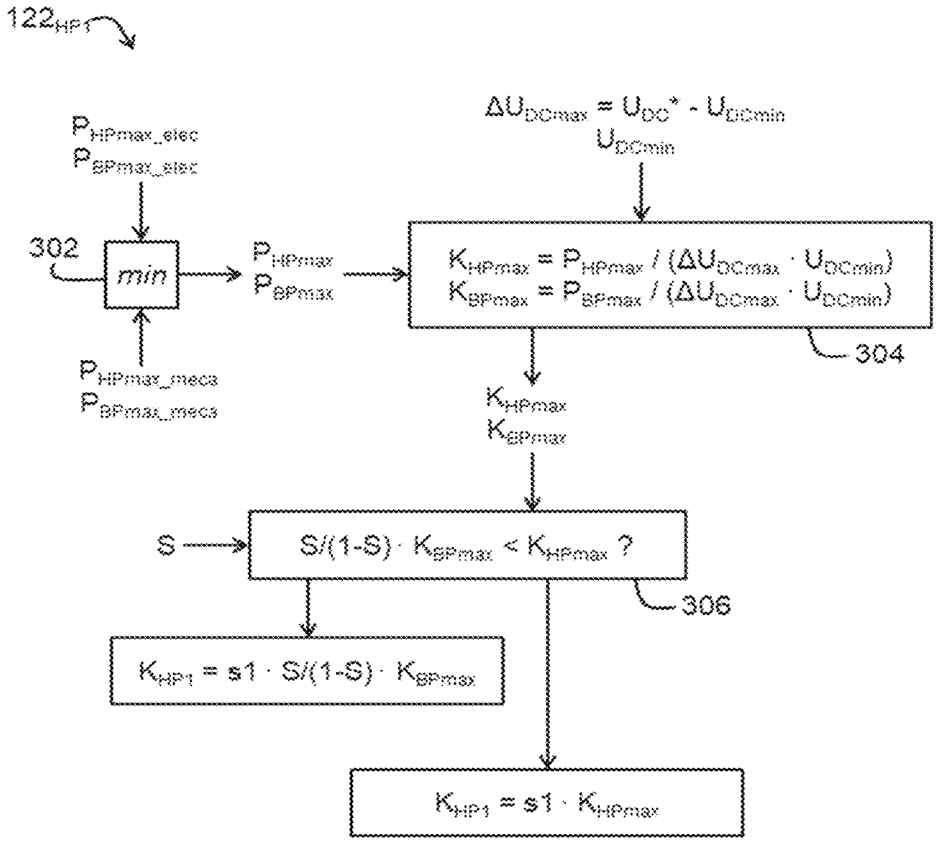

[Fig. 11]
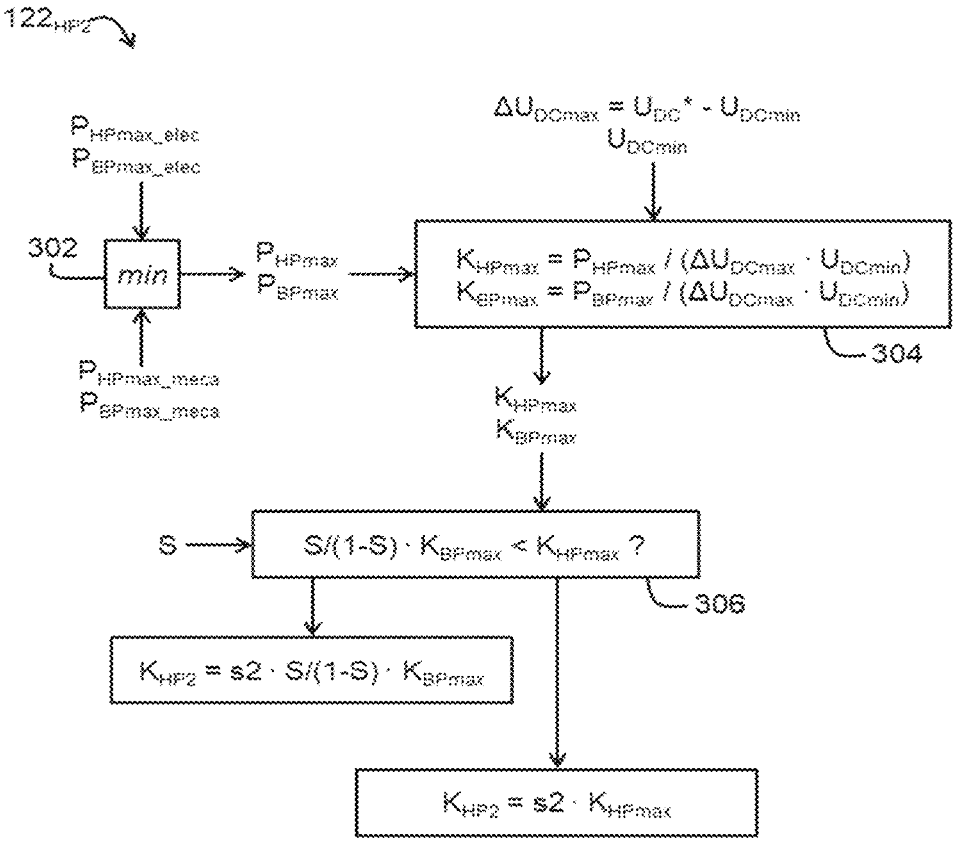

[Fig. 12]
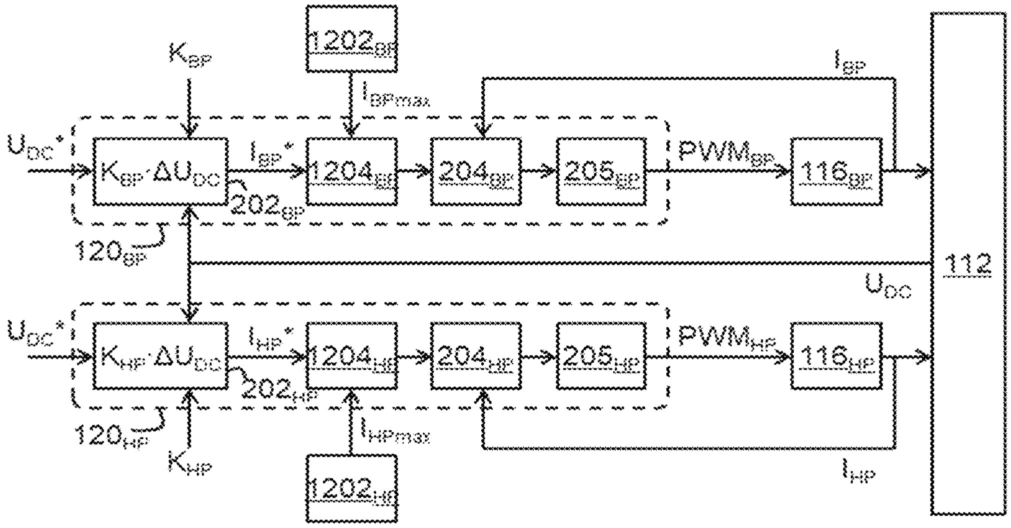

[Fig. 13]
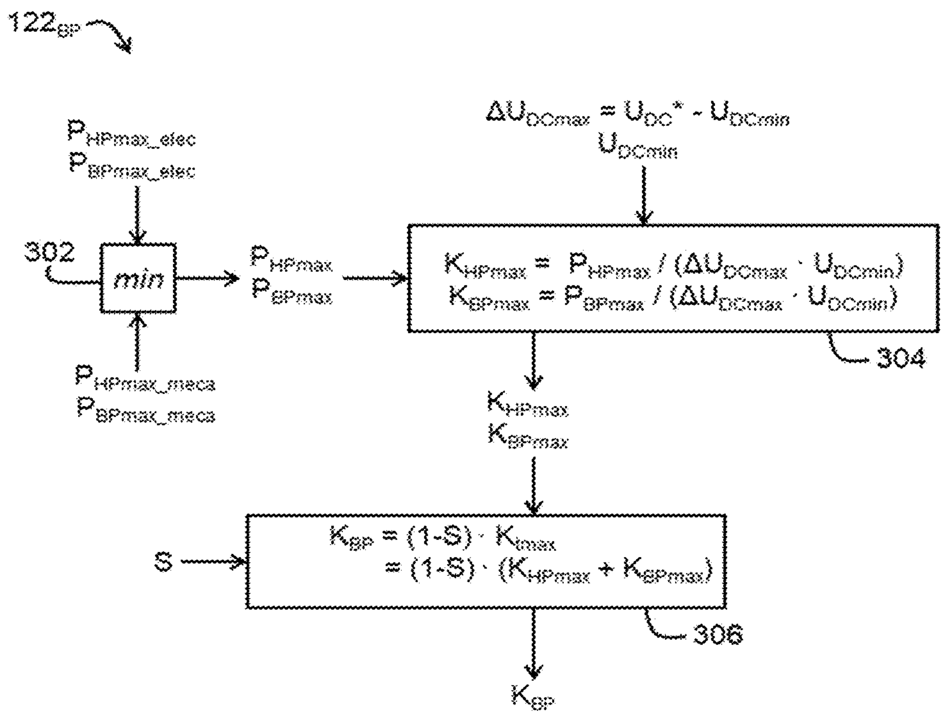

[Fig. 14]
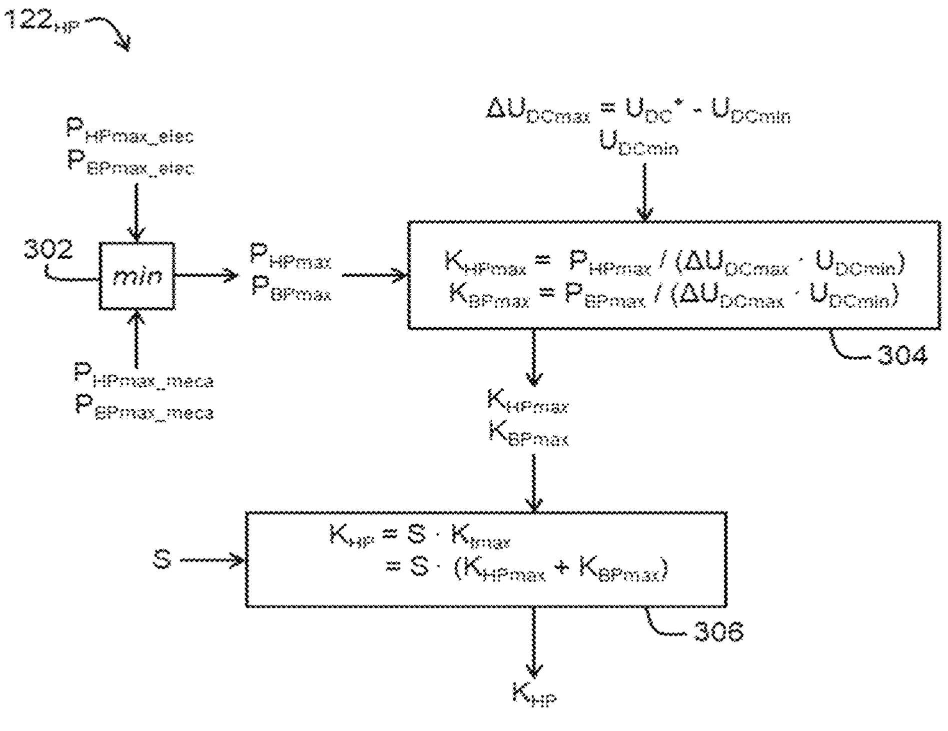

[Fig. 15]
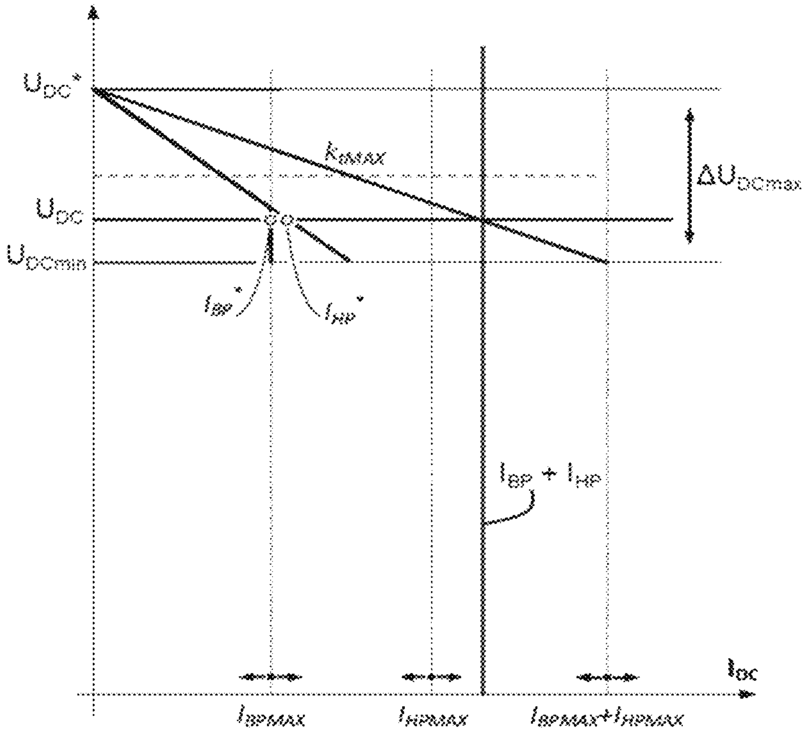

PROVIDING ENERGY IN AN AIRCRAFT USING DROOP CONTROL

TECHNICAL FIELD OF THE INVENTION

The present invention relates to an apparatus for providing energy in an aircraft, an aircraft comprising such an apparatus, and a corresponding method.

TECHNOLOGICAL BACKGROUND

It is known from the prior art to provide, in an aircraft, an energy providing apparatus of the type comprising:

- a DC bus to which at least one electrical load is intended to be connected;
- several electrical sources including:
  - at least one electrical source referred to as low-pressure electrical source designed to draw power from a low-pressure body of an aircraft turbomachine, in order to provide a current to the DC bus, and
  - at least one electrical source referred to as high-pressure electrical source designed to draw power from a high-pressure body of the turbomachine of the aircraft, in order to provide a current to the DC bus.

It may be desirable to provide a robust regulation of the electrical sources so as not to interfere significantly with the operation of the turbomachine.

For example, the document GB 2510121 A1 describes a frequency or voltage droop regulation with a master/slave system.

SUMMARY OF THE INVENTION

An apparatus for providing energy in an aircraft, of the abovementioned type, is therefore proposed, characterised in that it further comprises:

- a system for calculating a droop gain for each low-pressure electrical source and each high-pressure electrical source, on the basis of at least one operating characteristic of the turbomachine; and
- for each low-pressure electrical source and each high-pressure electrical source, a control module for controlling the electrical source under consideration, designed to implement a droop regulation on the basis of the droop gain calculated for the electrical source under consideration.

Thanks to the invention, it is possible to implement a decentralised regulation, i.e. independent from one electrical source to another. In this way, the regulation is robust to the loss of one of the sources. In addition, the fact that the droop gains are calculated on the basis of at least one operating characteristic of the turbomachine means that they can be defined in accordance with the desired operating point, so that the regulation does not substantially interfere with the operation of the turbomachine.

An energy providing apparatus according to the invention may further comprise one or more of the following optional characteristics, in any technically feasible combination.

Optionally, the at least one operating characteristic of the turbomachine comprises at least one of: a fuel inlet flow rate and/or an air inlet flow rate into a combustion chamber of the turbomachine, a rotational speed of the low-pressure body, a rotational speed of the high-pressure body, an air inlet temperature and/or a fuel inlet temperature and/or a temperature of exhaust gases leaving the combustion chamber.

Also optionally, the droop gain calculation system comprises:—a turbomachine controller designed to define a ratio between the power drawn from the high-pressure body by the high-pressure electrical source or sources and the power drawn from the low-pressure body by the low-pressure electrical source or sources, on the basis of the operating characteristic or characteristics of the turbomachine; and—for each electrical source, a module for calculating, on the basis of the ratio, the droop gain of the electrical source under consideration, so that the ratio is complied with.

Optionally also, the controller is designed to provide data referred to as power data representative of a maximum low pressure mechanical power that can be drawn from the low pressure body and a maximum high pressure mechanical power that can be drawn from the high pressure body, and each calculation module is designed to calculate the associated droop gain from the power data, so that the mechanical power drawn from the low pressure body remains less than or equal to the maximum low pressure mechanical power and the mechanical power drawn from the high pressure body remains less than or equal to the maximum high pressure mechanical power.

Also optionally, each calculation module is designed to calculate the associated droop gain so as to maximise a sum of the currents that can be respectively provided by the electrical sources, when the DC bus has a minimum bus voltage predefined by the droop regulation.

Also optionally, the apparatus comprises several high-pressure electrical sources and/or several low-pressure electrical sources, and the calculation module of each high-pressure or respectively low-pressure electrical source is designed to calculate the associated droop gain from a ratio between, on the one hand, the current provided by the high-pressure or respectively low-pressure source under consideration and, on the other hand, a sum of the currents respectively provided by all the high-pressure or respectively low-pressure electrical sources.

Also optionally, each calculation module is designed to calculate the droop gain of the high-pressure electrical source as the product of the ratio and a constant and the droop gain of the low-pressure electrical source as the product of the one's complement of the ratio and the constant.

Also optionally, each control module is designed to:

- calculate a reference current from the associated droop gain;
- calculate, from the power data, a maximum current that can be provided by the associated electrical source; and
- limit the reference current to the maximum current.

An aircraft comprising an apparatus according to the invention is also proposed.

A method for providing energy in an aircraft is also proposed, characterised in that it comprises:

- calculating, from at least one measurement of at least one operating characteristic of a turbomachine, a droop gain for:
  - each electrical source referred to as low-pressure electrical source designed to draw power from a low-pressure body of the turbomachine of the aircraft, in order to provide a current to a DC bus to which at least one electrical load is intended to be connected, and
  - each electrical source referred to as high-pressure electrical source designed to draw power from a high-pressure body of the turbomachine of the aircraft, in order to provide a current to the DC bus; and
- for each low-pressure electrical source and each high-pressure electrical source, implementing a droop regulation on the basis of the droop gain calculated for the electrical source under consideration.

BRIEF DESCRIPTION OF THE FIGURES

The invention will be better understood with the aid of the following description, given only by way of example and made with reference to the attached drawings in which:

FIG. 1 is a simplified view of an apparatus according to the invention for providing energy in an aircraft, FIG. 2 is a functional view of control modules for two electrical sources respectively coupled to a low-pressure body and a high-pressure body of a turbomachine, in order to provide currents to a DC bus, the control modules implementing a droop regulation, FIG. 3 is a functional view of a droop gain calculation module for the control module of the electrical source coupled to the low-pressure body, FIG. 4 is a functional view of a droop gain calculation module for the control module of the electrical source coupled to the high-pressure body, FIG. 5 is a curve illustrating the relationship between the droop gains in order to achieve a desired distribution between mechanical power drawn from the low-pressure body and the mechanical power drawn from the high-pressure body, in a first operating case, FIG. 6 illustrates the currents provided by the electrical sources as a function of a DC bus voltage, in the first operating case, FIG. 7 is a curve illustrating the relationship between the droop gains in order to achieve a desired distribution between mechanical power drawn from the low-pressure body and the mechanical power drawn from the high-pressure body, in a second operating case, FIG. 8 illustrates the currents provided by the electrical sources as a function of the DC bus voltage, in the second operating case, FIG. 9 is a simplified view of another apparatus according to the invention for providing energy in an aircraft, with several electrical sources coupled to the high-pressure body, FIG. 10 is a functional view of a droop gain calculation module for the control module of one of the electrical sources coupled to the high-pressure body, FIG. 11 is a functional view of a droop gain calculation module for the control module of the other of the electrical sources coupled to the high-pressure body, FIG. 12 is a functional view of an alternative of the control modules, FIG. 13 is a functional view of an alternative droop gain calculation module for the control module of the electrical source coupled to the low-pressure body, FIG. 14 is a functional view of an alternative droop gain calculation module for the control module of the electrical source coupled to the high-pressure body, and FIG. 15 illustrates the currents provided by the electrical sources as a function of the DC bus voltage, in the alternative of FIGS. 12 to 14.

DETAILED DESCRIPTION OF THE INVENTION

With reference to FIG. 1, an example of an apparatus 100 for providing energy in an aircraft will now be described.

The apparatus 100 firstly comprises a turbomachine 102 comprising a low-pressure (BP) body 104 and a high-pressure (HP) body 106. The turbomachine 102 is, for example, an aircraft propulsion turbomachine.

The apparatus 100 also comprises a controller 108 for the turbomachine 102. This controller 108 is designed, for example, to regulate a fuel inlet flow rate and/or an air inlet flow rate into a combustion chamber of the turbomachine 102. To adjust the air inlet flow rate, the controller 108 controls, for example, the orientation of stator blades of a high pressure (HP) compressor 110 of the HP body 106. The controller 108 is designed, for example, to make these adjustments on the basis of at least one characteristic (measured and/or estimated, for example on the basis of other measurements) of operation of the turbomachine 102, for example one or more of: the fuel inlet flow rate and/or the air inlet flow rate, a rotational speed of the BP body 104, a rotational speed of the HP body 106, an air inlet temperature and/or a fuel inlet temperature and/or a temperature of exhaust gases leaving the combustion chamber.

The controller 108 is also designed to define a power draw ratio S between the BP body and the HP body. This ratio S is generally referred to as the "split" and expresses the proportion of mechanical power drawn from the HP 106 body (or alternatively from the BP 104 body) in relation to the mechanical power drawn from both the BP 104 and HP 106 bodies. The split S is expressed as a percentage, for example. The ratio S is defined on the basis of at least one characteristic (measured and/or estimated, for example on the basis of other measurements) of operation of the turbomachine 102, for example one or more of: the fuel inlet flow rate and/or the air inlet flow rate, a rotational speed of the BP body 104, a rotational speed of the HP body 106, an air inlet temperature and/or a fuel inlet temperature and/or a temperature of exhaust gases leaving the combustion chamber. The controller 108 is designed, for example, to define the split S on the basis of a look-up table associating values of the operating characteristic or characteristics of the turbomachine 102 with values of the split S.

Preferably, the controller 108 is also designed to calculate data referred to as power data representative of a maximum mechanical power that can be drawn from the BP body, noted $P_{BPmax\_meca}$, and a maximum mechanical power that can be drawn from the HP body, noted $P_{HPmax\_meca}$. This power data may comprise, for example, the maximum powers $P_{BPmax\_meca}$, $P_{HPmax\_meca}$ themselves or the maximum torques $C_{BPmax}$, $C_{HPmax}$ respectively provided by the BP body 104 and the HP body 106. The power data are for example calculated from at least one characteristic (measured and/or estimated, for example from other measurements) of operation of the turbomachine 102, for example one or more of: a torque of an output shaft of the turbomachine 102, the rotational speed of the BP body 104, the rotational speed of the HP body, the air inlet temperature and/or the fuel inlet temperature and/or the temperature of exhaust gases leaving the combustion chamber, the air inlet and/or fuel inlet flow rate, the air inlet and/or fuel inlet pressure, a torque provided by the BP body 104 and a torque provided by the HP body 106.

The apparatus 100 also comprises a direct current bus 112 to which at least one electrical load 114 is intended to be connected. Each load 114 corresponds, for example, to one or more items of equipment of the aircraft.

The apparatus 100 also comprises several electrical sources $\mathbf{116}_{BP}$, $\mathbf{116}_{HP}$, each designed to draw mechanical power from the turbomachine 102, in order to provide electrical power to the DC bus 112.

These electrical sources $\mathbf{116}_{BP}$, $\mathbf{116}_{HP}$ comprise in particular one or more electrical sources, referred to as low pressure (BP), each designed to draw mechanical power from the BP body 104 of the turbomachine 102, in order to provide electrical power to the DC bus 112. In FIG. 1, the apparatus 100 comprises a single electrical source BP, designated by the reference $\mathbf{116}_{BP}$.

The electrical sources $\mathbf{116}_{BP}$, $\mathbf{116}_{HP}$ also comprise one or more electrical sources, referred to as high pressure (HP), each designed to draw mechanical power from the HP body 106 of the turbomachine 102, in order to provide electrical power to the DC bus 112. In FIG. 1, the apparatus 100 comprises a single electrical source HP, designated by the reference $\mathbf{116}_{HP}$.

For example, each electrical source $\mathbf{116}_{BP}$, $\mathbf{116}_{HP}$ comprises a generator followed by a rectifier.

The apparatus 100 also comprises, for each electrical source $\mathbf{116}_{BP}$, $\mathbf{116}_{HP}$, a control module $\mathbf{120}_{BP}$, $\mathbf{120}_{HP}$ for the electrical source $\mathbf{116}_{BP}$, $\mathbf{116}_{HP}$ under consideration, in particular its rectifier. Each control module $\mathbf{120}_{BP}$, $\mathbf{120}_{HP}$ is designed to implement a droop regulation on the basis of a droop gain $K_{BP}$, $K_{HP}$ associated with the electrical source $\mathbf{116}_1$, $\mathbf{116}_2$ under consideration.

The apparatus 100 also comprises, for each electrical source $\mathbf{116}_{BP}$, $\mathbf{116}_{HP}$, a module $\mathbf{122}_{BP}$, $\mathbf{122}_{HP}$ for calculating, from the ratio S, the droop gain $K_{BP}$, $K_{HP}$ for the electrical source $\mathbf{116}_{BP}$, $\mathbf{116}_{HP}$ under consideration, so that the ratio S is complied with.

Generally speaking, the droop regulation consists of allowing the DC bus 112 to have a bus voltage $U_{DC}$ that can vary slightly, between a nominal voltage $U_{DC*}$ and a minimum voltage $U_{DCmin}$ lower than the nominal voltage $U_{DC*}$, hence the term "droop". Furthermore, in the droop regulation, each electrical source $\mathbf{116}_{BP}$, $\mathbf{116}_{HP}$ is regulated to provide a current $I_{BP}$, $I_{HP}$ proportional to the bus voltage drop $\Delta U_{DC}$ (equal to $U_{DC*}-U_{DC}$), the associated droop gain $K_{BP}$, $K^{HP}$ constituting the proportionality ratio*: $I_{BP}=K_{BP}\cdot\Delta U_{DC}$ and $I_{HP}=K_{HP}\cdot\Delta U_{DC}$.

In this way, the regulation of the electrical sources $\mathbf{116}_{BP}$, $\mathbf{116}_{HP}$ can be carried out independently of each other, but nevertheless remain coupled by the bus voltage $U_{DC}$ so as together to reach a point of equilibrium in which the electrical power contribution provided to the DC bus 112 by each electrical source $\mathbf{116}_{BP}$, $\mathbf{116}_{HP}$ is defined by the droop gains $K_{BP}$, $K_{HP}$. By adjusting the latter, it is therefore possible to set the relative contributions of the electrical sources $\mathbf{116}_{BP}$, $\mathbf{116}_{HP}$.

For example, the provided current $I_{BP}$, $I_{HP}$ is regulated to follow a reference current $I_{BP*}$, $I_{HP*}$ given by $I_{BP*}=K_{BP}\cdot\Delta U_{DC}$ and $I_{HP*}=K_{HP}\cdot\Delta U_{DC}$. This implementation example will now be described with reference to FIG. 2.

In this example, each control module $\mathbf{120}_{BP}$, $\mathbf{120}_{HP}$ comprises a block $\mathbf{202}_{BP}$, $\mathbf{202}_{HP}$ for calculating the reference current $I_{BP*}$, $I_{HP*}$ from the bus voltage $U_{DC}$, the nominal bus voltage $U_{DC*}$ and the droop gain $K_{BP}$, $K_{HP}$.

Each control module $\mathbf{122}_{BP}$, $\mathbf{122}_{HP}$ further comprises a block $\mathbf{204}_{BP}$, $\mathbf{204}_{HP}$ for comparing the current provided $I_{BP}$, $I_{HP}$ with the reference current $I_{BP*}$, $I_{HP*}$ to provide a current error. Each control module $\mathbf{122}_{BP}$, $\mathbf{122}_{HP}$ further comprises a regulation block designed to provide commands to the electrical source $\mathbf{116}_{BP}$, $\mathbf{116}_{HP}$ from the current error. These commands tend to make the current provided $I_{BP}$, $I_{HP}$ equal to the reference current $I_{BP*}$, $I_{HP*}$, in other words, they tend to cancel the current error. The commands are, for example, pulse-width modulation commands $PWM_{BP}$ or $PWM_{HP}$.

With reference to FIG. 3 and FIG. 4, an example of the implementation of the modules $\mathbf{122}_{BP}$, $\mathbf{122}_{HP}$ for calculating droop gains $K_{BP}$, $K_{HP}$ will now be described.

Each module $\mathbf{122}_{BP}$, $\mathbf{122}_{HP}$ comprises, for example, a block 302 for calculating a maximum electrical power $P_{BPmax}$, $P_{HPmax}$ that can be provided by the associated electrical source $\mathbf{116}_{BP}$, $\mathbf{116}_{HP}$. Preferably, this maximum electrical power $P_{BPmax}$, $P_{HPmax}$ takes account of the maximum mechanical power $P_{BPmax\_meca}$, $P_{HPmax\_meca}$ that can be drawn, which is, for example, provided by the controller 108 or calculated from the maximum torque provided by the controller 108 and the speed of rotation of the body BP 104, respectively of the body HP 106, and/or of a nominal power $P_{BPmax\_elec}$, $P_{HPmax\_elec}$ of the electrical source $\mathbf{116}_{BP}$, $\mathbf{116}_{HP}$ under consideration. For example, the maximum electrical power $P_{BPmax}$, $P_{HPmax}$ is the minimum between the maximum mechanical power $P_{BPmax\_meca}$, $P_{HPmax\_meca}$ that can be drawn and the nominal power $P_{BPmax\_elec}$, $P_{HPmax\_elec}$ of the electrical source $\mathbf{116}_{BP}$, $\mathbf{116}_{HP}$ under consideration.

Generally, the nominal powers $P_{BPmax\_elec}$, $P_{HPmax\_elec}$ of the electrical sources $\mathbf{116}_{BP}$, $\mathbf{116}_{HP}$ depend on their design and are fixed. On the other hand, the maximum mechanical powers $P_{BPmax\_meca}$, $P_{HPmax\_meca}$ that can be drawn generally depend on the operating point and the state of the turbomachine 102 and therefore change over time. This means that the maximum electrical powers $P_{BPmax}$ and $P_{HPmax}$ can change over time.

Each module $\mathbf{122}_{BP}$, $\mathbf{122}_{HP}$ also comprises a block 304 for calculating a maximum droop gain $K_{BPmax}$, $K_{HPmax}$, allowing the associated electrical source $\mathbf{116}_{BP}$, $\mathbf{116}_{HP}$ to provide the maximum power $P_{BPmax}$, $P_{HPmax}$, in particular when the bus voltage $U_{DC}$ is the minimum bus voltage $U_{DCmin}$.

In general, the same ratio S can be obtained by several droop gains $K_{BP}$, $K_{HP}$. Preferably, the modules $\mathbf{122}_{BP}$, $\mathbf{122}_{HP}$ for calculating the droop gains $K_{BP}$, $K_{HP}$ are designed to calculate the latter to maximise the sum of the currents $I_{BP}$, $I_{HP}$ that can be provided by the electrical sources $\mathbf{116}_{BP}$, $\mathbf{116}_{HP}$.

The maximum current $I_{BPmax}$, $I_{HPmax}$ that can be provided by each electrical source $\mathbf{116}_{BP}$, $\mathbf{116}_{HP}$ is that provided when the bus voltage $U_{DC}$ is equal to the minimum bus voltage $U_{DCmin}$, i.e. for a maximum voltage drop $\Delta U_{DCmax}=U_{DC}*-U_{DCmin}$. The maximum currents $I_{BPmax}$, $I_{HPmax}$ that can be provided are then given by: $I_{BPmax}=K_{BP}\cdot\Delta U_{DCmax}$ and $I_{HPmax}=K_{HP}\cdot\Delta U_{DCmax}$. Thus, taking into account the calculated maximum powers $P_{BPmax}$, $P_{HPmax}$, the maximum droop gains $K_{BPmax}$, $K_{BPmax}$ are given by: $K_{BPmax}=P_{BPmax}/(\Delta U_{DCmax}\cdot U_{DCmin})$ et $K_{HPmax}=P_{HPmax}/(\Delta U_{DCmax}\cdot U_{DCmin})$.

Furthermore, the ratio S is given by $S=K_{HP}/(K_{HP}+K_{BP})$. Thus, for a given ratio S, the droop gains are related to each other by $K_{BP}=(1-S)/S\cdot K_{HP}$.

Referring to FIGS. 5 to 7, it is easy to see that the sum of the currents supplied $I_{BP}$, $I_{HP}$ is at its maximum when one of the droop gains $H_{HP}$, $K_{HP}$ is at its maximum. To comply with the maximum powers $P_{BPmax}$, $P_{HPmax}$, it is also necessary to ensure that the other droop gain $K_{BP}$, $K_{HP}$ is well below (or equal to) its maximum. In the example shown in FIGS. 5 and 6, it is the droop gain $K_{HP}$ that can reach its maximum $K_{HPmax}$, with the other droop gain $K_{BP}$ below its maximum $K_{BPmax}$. The droop gain $K_{BP}$ is then $K_{BP}=(1-S)/S\cdot K_{HPmax}$. In the example shown in FIGS. 7 and 8, it is the droop gain $K_{BP}$ that can reach its maximum $K_{BPmax}$, with the other droop gain $K_{HP}$ below its maximum $K_{HPmax}$. The droop gain $K_{HP}$ is then $K_{HP}=S/(1-S)\cdot K_{BPmax}$.

Thus, each of the modules $\mathbf{122}_{BP}$, $\mathbf{122}_{HP}$ also comprises a block 306 designed to determine whether the droop gain $K_{BP}$, $K_{HP}$ to be provided should be taken at its maximum or not. For example, the block 306 of each module $\mathbf{122}_{BP}$, $\mathbf{122}_{HP}$ is designed to determine whether the droop gain $K_{BP}$, $K_{HP}$ to be provided is less than its maximum $K_{BPmax}$, $K_{HPmax}$, assuming the other droop gain is at its maximum. For example, the block 306 of the module $\mathbf{122}_{BP}$ checks whether $(1-S)/S \cdot K_{HPmax}$ is less than $K_{BPmax}$, while the block 306 of the module 122$_{HP}$ checks whether $S/(1-S) \cdot K_{BPmax}$ is less than $K_{HPmax}$. Alternatively, other equivalent inequalities could be used.

If the block 306 determines that the droop gain $K_{BP}$, $K_{HP}$ to be provided should be taken at its maximum, each module 122$_{BP}$, 122$_{HP}$ is designed to provide the droop gain $K_{BP}$, $K_{HP}$ at its maximum $K_{BPmax}$, $K_{HPmax}$.

Alternatively, each module 122$_{BP}$, 122$_{HP}$ is designed to calculate the droop gain $K_{BP}$, $K_{HP}$ to be provided from the ratio S and the other droop gain $K_{BP}$, $K_{HP}$, taken at its maximum $K_{BPmax}$, $K_{HPmax}$.

With reference to FIG. 9, another example of an apparatus 900 providing energy in an aircraft will now be described.

The apparatus 900 is similar to the apparatus 100 in FIG. 1, except that it comprises several high-pressure electrical sources instead of just one, two in the example described, designated by the references 116$_{HP1}$, 116$_{HP2}$. Overall, these two high-pressure electrical sources 116$_{HP1}$, 116$_{HP2}$ behave like the single high-pressure electrical source 116$_{HP}$ of FIG. 1.

The apparatus 900 thus comprises, for each high-pressure electrical source 116$_{HP1}$, 116$_{HP2}$, a control module 120$_{HP1}$, 120$_{HP2}$ and a module 122$_{HP1}$, 122$_{HP2}$ for calculating the respective droop gain $K_{HP1}$, $K_{HP2}$.

In this case, with reference to FIG. 10 and FIG. 11, each module 122$_{HP1}$, 122$_{HP2}$ uses, for example, a respective secondary ratio s1, s2. Each secondary ratio s1, s2 represents the portion of the current $I_{HP1}$, $I_{HP2}$ provided by the high-pressure electrical source 122$_{HP1}$, 122$_{HP2}$ under consideration relative to the sum of the currents $I_{HP1}$, $I_{HP2}$ provided by the assembly of the high-pressure electrical sources 116$_{HP1}$, 116$_{HP2}$. So the sum of the secondary ratios s1, s2 is one. These secondary ratios s1, s2 are fixed, for example.

For example, each module 122$_{HP1}$, 122$_{HP2}$ is identical to the module 122$_{HP}$, except that the secondary ratio s1, s2 is taken into account when calculating the droop gain $K_{HP1}$, $K_{HP2}$ to be provided.

In the example shown, the blocks 306 are designed to test equality using a total high pressure gain $K_{HP}=K_{HP1}+K_{HP2}$, in the same way as in FIG. 4. Alternatively, other equivalent inequalities could be used, for example $s1 \cdot S/(1-S) \cdot K_{BPmax} < K_{HP1max} = s1 \cdot K_{HPmax}$ for the block 306 of the module 122$_{HP1}$ and $s2 \cdot S/(1-S) \cdot K_{BPmax} < K_{HP1max} = s2 \cdot K_{HPmax}$ for the block 306 of the module 122$_{HP2}$.

With reference to FIG. 12, a further example of the implementation of the control modules 120$_{BP}$, 120$_{HP}$ will now be described.

The control modules 120$_{BP}$, 120$_{HP}$ are identical to those in FIG. 2, except that they each also comprise a module 1202$_{BP}$, 1202$_{HP}$ for calculating a maximum current $I_{BPmax}$, $I_{HPmax}$ and a module 1204$_{BP}$, 1204$_{HP}$ for limiting the reference current $I_{BP}$*, $I_{HP}$* to this maximum current $I_{BPmax}$, $I_{HPmax}$. Thus, as long as each reference current $I_{BP}$*, $I_{HP}$* is less than its respective maximum current $I_{BPmax}$, $I_{HPmax}$, the electrical sources 116$_{BP}$, 116$_{HP}$ are controlled according to the droop gains $K_{BP}$, $K_{HP}$, so that the split S is respected. On the other hand, if one of the reference currents $I_{BP}$*, $I_{HP}$* becomes greater than its respective maximum current $I_{BPmax}$, $I_{HPmax}$, this reference current $I_{BP}$*, $I_{HP}$* is limited, and therefore also the current $I_{BP}$, $I_{HP}$ provided to the DC bus 112. The other reference current $I_{BP}$*, $I_{HP}$* can then continue to increase (until it reaches its associated maximum current $I_{BPmax}$, $I_{HPmax}$). This allows more current to be delivered to the DC bus 112, to the detriment of the split S, which is no longer respected.

With reference to FIG. 13 and FIG. 14, another example of implementation of the modules 122$_{BP}$, 122$_{HP}$ for calculating the droop gains $K_{BP}$, $K_{HP}$ of FIG. 1, which can in particular be used in combination with the control modules 120$_{BP}$, 120$_{HP}$ of FIG. 12, will now be described.

The modules 122$_{BP}$, 122$_{HP}$ are identical to those of FIG. 3 and FIG. 4, except that they comprise, instead of the block 306, a block 1302 for calculating the droop gain $K_{BP}$, $K_{HP}$ from a constant $K_{tmax}$ deduced from the maximum powers $P_{BPmax}$, $P_{HPmax}$ and the split S.

More precisely, the droop gain $K_{HP}$ is given by: $K_{HP}=S \cdot K_{tmax}$, while the droop gain $K_{HP}$ is given by: $K_{BP}=(1-S) \cdot K_{tmax}$. $(1-S)$ is therefore the one's complement of the split S.

Preferably, the constant $K_{tmax}$ is equal to the sum of the maximum droop gains $K_{BPmax}$, $K_{HPmax}$: $K_{tmax}=K_{BPmax}+K_{HPmax}$.

The bus voltage $U_{DC}$ as a function of the currents $I_{BP}$, $I_{HP}$ provided to the DC bus 112 is shown in FIG. 15, in the case of a 50% split. As can be seen, the $I_{BP}$* reference current has reached saturation.

In conclusion, it should be noted that the invention is not limited to the embodiments described above. In fact, it will appear to the person skilled in the art that various modifications can be made to the above-described embodiments, in the light of the teaching just disclosed.

In the foregoing detailed presentation of the invention, the terms used should not be interpreted as limiting the invention to the embodiments exposed in the present description, but should be interpreted to include all equivalents the anticipation of which is within the reach of the person skilled in the art by applying his general knowledge to the implementation of the teaching just disclosed.

The invention claimed is:

1. An apparatus for providing energy in an aircraft, comprising:

- a DC bus to which at least one electrical load is intended to be connected;
- several electrical sources including:
  - at least one electrical source referred to as low-pressure electrical source designed to draw power from a low-pressure body of a turbomachine of the aircraft, in order to provide a current to the DC bus, and
  - at least one electrical source referred to as high-pressure electrical source designed to draw power from a high-pressure body of the turbomachine of the aircraft, in order to provide a current to the DC bus;

wherein the apparatus further comprises:

- a system for calculating a droop gain for each low-pressure electrical source and each high-pressure electrical source, on the basis of at least one operating characteristic of the turbomachine; and
- for each low-pressure electrical source and each high-pressure electrical source, a module for controlling the electrical source under consideration, designed to implement a droop regulation on the basis of the droop gain calculated for the electrical source under consideration.

2. The apparatus according to claim 1, wherein the at least one operating characteristic of the turbomachine comprises at least one of: a fuel inlet flow rate and/or an air inlet flow rate into a combustion chamber of the turbomachine, a rotational speed of the low-pressure body, a rotational speed of the high-pressure body, an air inlet temperature and/or fuel inlet temperature and/or temperature of exhaust gases leaving the combustion chamber.

3. The apparatus according to claim 1, wherein the system for calculating droop gains comprises:

a controller of the turbomachine designed to define a ratio between the power drawn from the high-pressure body by the high-pressure electrical source or sources and the power drawn from the low-pressure body by the low-pressure electrical source or sources, on the basis of the operating characteristic or characteristics of the turbomachine; and for each electrical source for calculating, from the ratio, the droop gain of the electrical source under consideration, so that the ratio is complied with.

4. The apparatus according to claim 3, wherein the controller is designed to provide data referred to as power data representative of a maximum low-pressure mechanical power that can be drawn from the low-pressure body and a maximum high-pressure mechanical power that can be drawn from the high-pressure body, and wherein each calculation module is designed to calculate the associated droop gain from the power data, so that the mechanical power drawn from the low-pressure body remains less than or equal to the maximum low-pressure mechanical power and the mechanical power drawn from the high-pressure body remains less than or equal to the maximum high-pressure mechanical power.

5. The apparatus according to claim 4, wherein each calculation module is designed to calculate the associated droop gain so as to maximise a sum of the currents which can respectively be provided by the electrical sources, when the DC bus has a minimum bus voltage predefined by the droop regulation.

6. The apparatus according to claim 1, comprising a plurality of high-pressure electrical sources and/or a plurality of low-pressure electrical sources, and wherein the calculation module of each high-pressure electrical source, respectively low-pressure electrical source, is designed to calculate the associated droop gain on the basis of a ratio between, on the one hand, the current provided by the high-pressure source, respectively low-pressure source, under consideration and, on the other hand, a sum of the currents respectively provided by all the high-pressure electrical sources, respectively low-pressure electrical sources.

7. The apparatus according to claim 4, wherein each calculation module is designed to calculate the droop gain of the high-pressure electrical source as the product of the ratio and a constant and the droop gain of the low-pressure electrical source as the product of the one's complement of the ratio and the constant.

8. The apparatus according to claim 1, wherein each control module is designed to:

calculate a reference current from the associated droop gain;

calculate, from the power data, a maximum current that can be provided by the associated electrical source; and limit the reference current to the maximum current.

9. An aircraft comprising an apparatus according to claim 1.

10. A method for providing energy in an aircraft, wherein said method comprises:

calculating, from at least one measurement of at least one operating characteristic of a turbomachine, a droop gain for:

each electrical source referred to as low-pressure electrical source designed to draw power from a low-pressure body of the turbomachine of the aircraft, in order to provide a current to a DC bus to which at least one electrical load is intended to be connected, and each electrical source referred to as high-pressure electrical source designed to draw power from a high-pressure body of the turbomachine of the aircraft, in order to provide a current to the DC bus; and for each low-pressure electrical source and each high-pressure electrical source, a droop regulation is implemented on the basis of the droop gain calculated for the electrical source under consideration.

* * * * *